US009815562B2

(12) United States Patent
Yamaguchi et al.

(10) Patent No.: US 9,815,562 B2
(45) Date of Patent: Nov. 14, 2017

(54) FUEL TANK DAM

(71) Applicant: MITSUBISHI HEAVY INDUSTRIES, LTD., Tokyo (JP)

(72) Inventors: Eizaburo Yamaguchi, Tokyo (JP); Akihisa Okuda, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 14/907,735

(22) PCT Filed: Sep. 11, 2014

(86) PCT No.: PCT/JP2014/074066
§ 371 (c)(1),
(2) Date: Jan. 26, 2016

(87) PCT Pub. No.: WO2015/037660
PCT Pub. Date: Mar. 19, 2015

(65) Prior Publication Data
US 2016/0159490 A1 Jun. 9, 2016

(30) Foreign Application Priority Data
Sep. 11, 2013 (JP) .................. 2013-188338

(51) Int. Cl.
*B65D 25/00* (2006.01)
*B64D 37/08* (2006.01)
*B64C 3/34* (2006.01)

(52) U.S. Cl.
CPC ............... *B64D 37/08* (2013.01); *B64C 3/34* (2013.01)

(58) Field of Classification Search
CPC .................. B64D 37/02–37/28; B64C 3/34
USPC ...... 220/694, 734, 729, 731, 677; 244/123.1, 244/123.6, 135 R, 123.5, 123.7, 123.8, 244/124, 131, 119, 120, 117 R; 428/116
See application file for complete search history.

(56) References Cited

U.S. PATENT DOCUMENTS 2,552,119 A    5/1951   Scharenberg
4,556,439 A   12/1985   Bannink, Jr.
(Continued)

FOREIGN PATENT DOCUMENTS

CN    103174556 A    6/2013
CN    103215677 A    7/2013
(Continued)

OTHER PUBLICATIONS

Europe Patent Office, "Search Report for European Patent Application No. 14844193.4," dated Apr. 29, 2016.
(Continued)

*Primary Examiner* — Kareen Thomas
(74) *Attorney, Agent, or Firm* — Manabu Kanesaka; Benjamin Hauptman; Kenneth Berner

(57) ABSTRACT

A fuel tank dam closes a gap that is formed between a first structural component and a second structural component. The fuel tank dam includes a first portion disposed on a first structural component side, a second portion disposed on a second structural component side, an elastic member that is supported by the first portion at one end while supported by the second portion at the other end and closes a gap that is formed between the first portion and the second portion, and a sealing mechanism that seals between the first member and the elastic member.

20 Claims, 17 Drawing Sheets

(56) References Cited

U.S. PATENT DOCUMENTS

| | | | |
|---|---|---|---|
| 6,435,557 B1* | 8/2002 | Palvoelgyi | B60K 15/067 |
| | | | 220/4.14 |
| 8,167,245 B1 | 5/2012 | Koehler et al. | |
| 8,689,816 B2 | 4/2014 | Pifer | |
| 2004/0166333 A1 | 8/2004 | Byrd et al. | |
| 2004/0213953 A1 | 10/2004 | Brantley et al. | |
| 2005/0034781 A1 | 2/2005 | Rodousakis et al. | |
| 2007/0283866 A1* | 12/2007 | Veazey | B63B 3/04 |
| | | | 114/77 R |
| 2012/0049000 A1* | 3/2012 | Kajita et al. | B29C 70/088 |
| | | | 244/119 |
| 2012/0241560 A1 | 9/2012 | Erickson | |
| 2012/0280083 A1 | 11/2012 | Dazet | |
| 2013/0062352 A1 | 3/2013 | Tachibana | |
| 2014/0284426 A1* | 9/2014 | Erickson et al. | B64C 1/06 |
| | | | 244/135 R |

FOREIGN PATENT DOCUMENTS

| | | |
|---|---|---|
| CN | 203114105 U | 8/2013 |
| FR | 1580796 A | 9/1969 |
| JP | 2006-153624 | 6/2006 |
| JP | 2006-153624 A | 6/2006 |
| JP | 2012-201361 | 10/2012 |
| WO | 2011/145291 A1 | 11/2011 |
| WO | 2013/096190 A1 | 6/2013 |

OTHER PUBLICATIONS

China Patent Office, "Office Action for Chinese Patent Application No. 201480041349.8," dated Aug. 17, 2016.
PCT, "International Search Report for International Application No. PCT/JP2014/074066".
PCT/IB/338, "Notification of Transmittal of Translation of the International Preliminary Report on Patentability for International Application No. PCT/JP2014/074066," dated Mar. 24, 2016.
PCT/IB/373, "International Preliminary Report on Patentability for International Application No. PCT/JP2014/074066," dated Mar. 15, 2016.
PCT/ISA/237, "Written Opinion of the International Searching Authority for International Application No. PCT/JP2014/074066," dated Dec. 9, 2014.
PCT/IB/326, "Notification Concerning Transmittal of International Preliminary Report on Patentability for International Application No. PCT/JP2014/074066," dated Mar. 24, 2016.
Japan Patent Office, "Office Action for Japanese Patent Application No. 2013-188338," dated May 31, 2017.

* cited by examiner

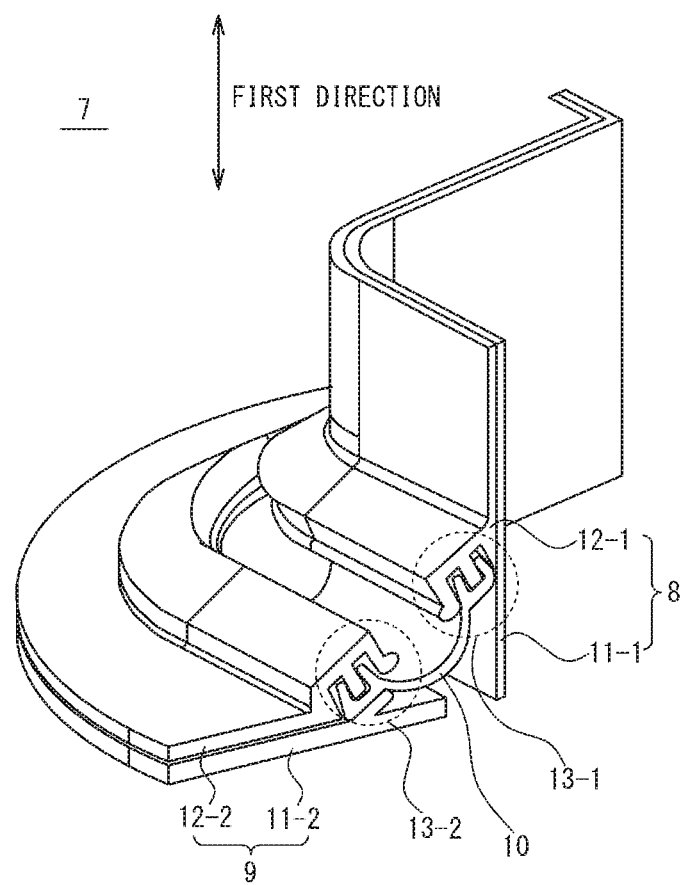

FUEL TANK DAM

TECHNICAL FIELD

The present invention relates to a fuel tank dam and a closing method.

BACKGROUND ART

In an aircraft, a fuel tank is installed on a main wing and so on. The fuel tank is formed by a plurality of structural components which constitute the main wing and so on. Regarding the fuel tank, there is a case in which a fuel tank dam is disposed between the structural components in order to close a gap.

As the fuel tank dam, there is a case in which sheet metal components are used. However, in many cases, a shape of the plurality of structural components of the aircraft is a complex shape in order to suppress an increase in weight while ensuring strength. As a result, a shape of the fuel tank dam is also likely to become a complex shape. In the case of using the sheet metal components, it is necessary to prepare a large number of sheet metal components having complex shape, and manufacturing costs are increased.

In Patent Literature 1 (U.S. Pat. No. 8,167,245), a fuel dam is disclosed. This fuel dam has a seal dam member. The seal dam member has a first portion connected with a first body, a second portion connected with the first portion and being more flexible than the first portion, and a third portion connected with the second portion and connected with a second body. The second portion is bended to accommodate deflection between the first body and the second body.

Further, in Patent Literature 2 (JP 2006-153624 A), a plug for leakage test is disclosed. The plug closes a rib opening part formed in a rib of a main wing when the leakage test is performed on a wing fuel tank of an aircraft. The plug for leakage test has a fitting member including a plate and an engaging means fixed to the plate and engaging with the rib opening part. The fitting member is configured to make the plate fit in the rib opening part from one side of the rib opening part. The plug for leakage test has a pressing member which is disposed on the other side of the rib opening part via the rib so as to oppose the fitting member. The pressing member is extended to a peripheral portion of the rib opening part. The plug for leakage test also has a compressible sealing member disposed to contact the pressing member and a coupling means coupling the fitting member and the pressing member. The fitting member is engaged with the rib via the engaging means and is supported by the rib. The sealing member is pressed by the pressing member to be deformed. Thereby, the sealing member closes the gap formed between the fitting member and the rib opening part.

Further, in Patent Literature 3 (International Patent Publication WO 2011/145291), technique relating to an occluding member for an opening formed in a panel which constitutes an outer surface of an aircraft is disclosed.

CITATION LIST

Patent Literature

Patent Literature 1: U.S. Pat. No. 8,167,245 B1
Patent Literature 2: JP 2006-153624 A
Patent Literature 3: WO 2011/145291 A1

SUMMARY OF THE INVENTION

Regarding the fuel tank dam, high sealing properties are required. Therefore, an object of the present invention is to provide a fuel tank dam and a closing method with which it is possible to enhance the sealing properties.

A fuel tank dam according to one embodiment of the present invention is a fuel tank dam which closes a gap formed between a first structural component and a second structural component. The fuel tank dam includes: a first portion disposed on a first structural component side; a second portion disposed on a second structural component side; an elastic member supported by the first portion at one end while supported by the second portion at the other end, and closing a gap formed between the first portion and the second portion; and a sealing mechanism which seals between the first portion and the elastic member.

A closing method according to one embodiment of the present invention has a step of closing a gap formed between a first structural component of a fuel tank and a second structural component of the fuel tank by a fuel tank dam. The fuel tank dam includes: a first portion disposed on a first structural component side; a second portion disposed on a second structural component side; an elastic member supported by the first portion at one end while supported by the second portion at the other end, and closing a gap formed between the first portion and the second portion; and a sealing mechanism which seals between the first portion and the elastic member. The step of closing a gap includes a step of disposing the first portion on the first structural component and a step of disposing the second portion on the second structural component.

A fuel tank dam according to another embodiment of the present invention includes: an elastic member contacting a first structural component of a fuel tank at one end and contacting a second structural component of the fuel tank at the other end; a first fastener for fastening the one end of the elastic member and the first structural component; and a second fastener for fastening the other end of the elastic member and the second structural component. The elastic member is disposed to close a gap formed between the first structural component and the second structural component.

A fuel tank dam according to still another embodiment of the present invention includes: a first resin member joined to a first structural component of a fuel tank; a second resin member joined to a second structural component of the fuel tank; and an elastic member embedded in the first resin member at one end while embedded in the second resin member at the other end. The elastic member is disposed to close a gap formed between the first structural component and the second structural component.

A fuel tank dam according to still another embodiment of the present invention includes: an elastic member joined to a first structural component of a fuel tank at one end and joined to a second structural component of the fuel tank at the other end. The elastic member is disposed to close a gap formed between the first structural component and the second structural component. The elastic member has a plurality of folded portions formed between the one end and the other end.

According to the present invention, the fuel tank dam and the closing method with which it is possible to enhance the sealing properties are provided.

BRIEF DESCRIPTION OF THE DRAWINGS

FIG. 3 is a perspective view for illustrating a fuel tank dam according to a first embodiment.

DESCRIPTION OF EMBODIMENTS

With reference to the drawings, some embodiments will be explained below.

First Embodiment

<Fuel Tank>

Figure 1:
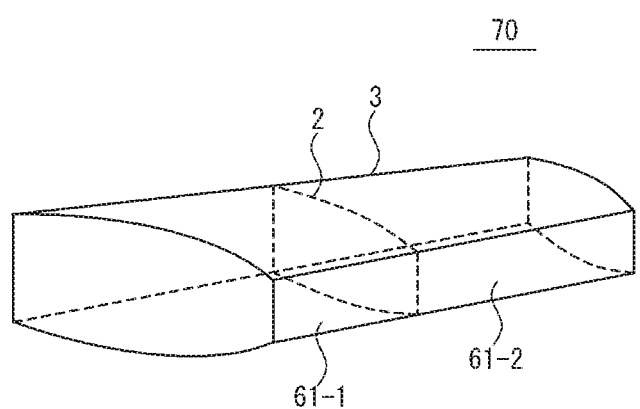
FIG. 1 is a schematic view of a main wing of an aircraft.

At first, a fuel tank structure to which a fuel tank dam according to the present embodiment is applied will be explained. FIG. 1 is the schematic view of a main wing 70 of an aircraft. As shown in FIG. 1, outer shape of the main wing 70 is defined by a skin 3. In the main wing 70, fuel tanks 61 (61-1, 61-2) are provided. Moreover, in the main wing 70, a rib 2 is provided. The fuel tank 61-1 and the fuel tank 61-2 are separated from each other by the rib 2.

Figure 2A:
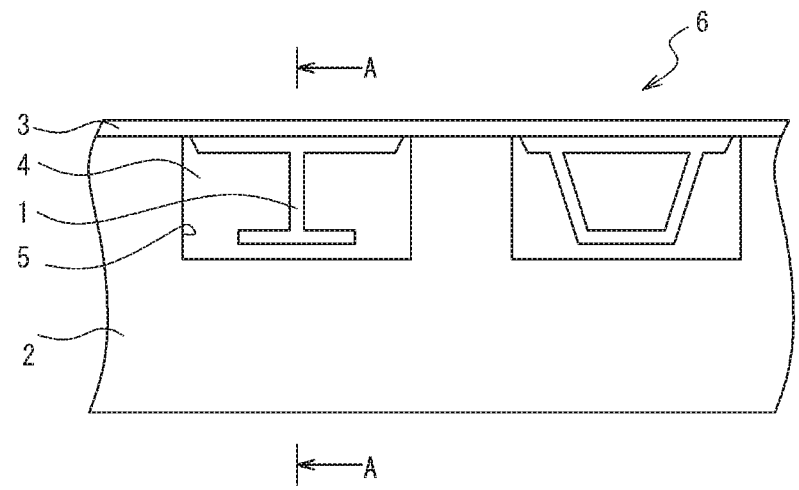
FIG. 2A is a view when viewing a part of a rib from the front.
Figure 2B:
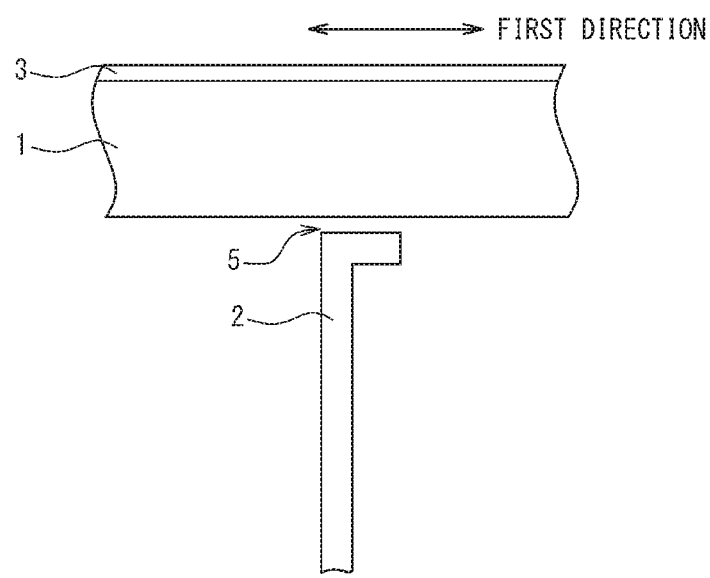
FIG. 2B is a cross-sectional view taken along line AA in FIG. 2A.

FIG. 2A is the view when a part of a joint portion between the rib 2 and the skin 3 is viewed from the front. In addition, FIG. 2B is the cross-sectional view taken along line AA in FIG. 2A. As shown in FIG. 2A and FIG. 2B, the stringer 1 is joined to the skin 3 in order to enhance the strength. The stringer 1 extends along a first direction (longitudinal direction of the main wing 70) (see FIG. 2B).

On the other hand, the rib 2 is arranged along a plane perpendicular to the first direction. In addition, a cutout portion 5 is formed at an end portion of the rib 2. The stringer 1 is disposed so as to pass through the cutout portion 5.

Note that, as shown in FIG. 2A, at the cutout portion 5, a gap 4 is formed between the stringer 1 (a first structural component or a second structural component) and the rib 2 (the second structural component or the first structural component). The fuel tank dam according to the present embodiment is used for closing the gap 4.

<Fuel Tank Dam>

Figure 4:
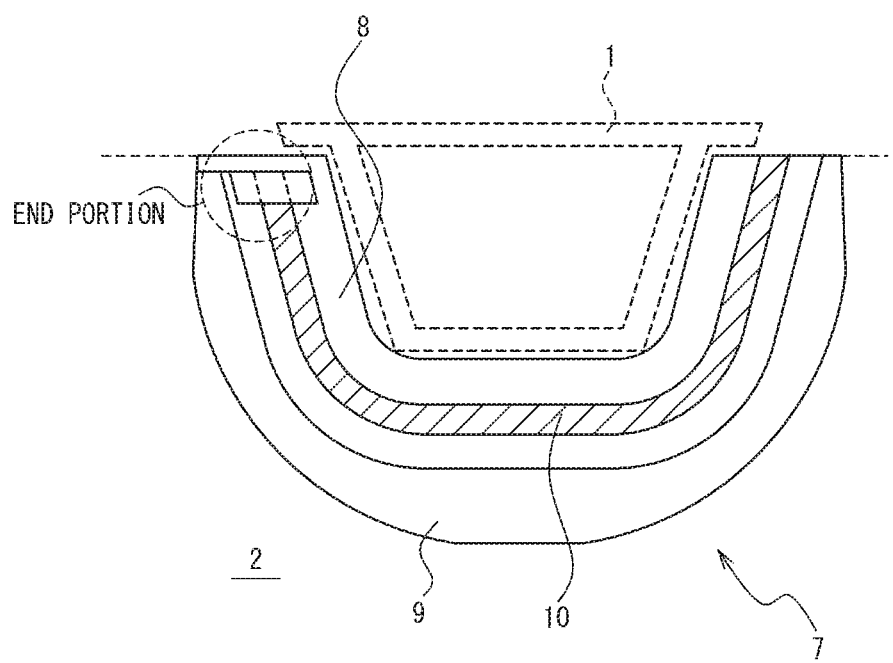
FIG. 4 is a front view of the fuel tank dam.

Next, a structure of the fuel tank dam will be explained. FIG. 3 is the perspective view of the fuel tank dam 7. In addition, FIG. 4 is the front view of the fuel tank dam 7. FIG. 4 is the view when the fuel tank dam 7 is viewed from a direction along the first direction. It should be noted that, in FIG. 4, for reference, outer shape of the stringer 1 and outer shape of the rib 2 are illustrated by dotted lines.

As shown in FIG. 3, the fuel tank dam 7 includes a first portion 8, a second portion 9, an elastic member 10, and a sealing mechanisms 13 (13-1, 13-2). The first portion 8 is a portion which is fixed (joined) to the stringer 1. The second portion 9 is a portion which is fixed (joined) to the rib 2. The elastic member 10 is supported by being sandwiched by the first portion 8 at one end, and is supported by being sandwiched by the second portion 9 at the other end. A gap formed between the first portion 8 and second portion 9 is closed by the elastic member 10. The sealing mechanism 13-1 seals between the first portion 8 and the elastic member 10. The sealing mechanism 13-2 seals between the second portion 9 and the elastic member 10.

As shown in FIG. 4, the fuel tank dam 7 is fixed to the stringer 1 such that the stringer 1 is covered with the first portion 8. The first portion 8 is bonded to the stringer 1 via, for example, a sealant. The second portion 9 is fixed to the rib 2. The second portion 9 is also bonded to the rib 2 via, for example, a sealant. Note that the gap between the first portion 8 and second portion 9 is closed by the elastic member 10. Thus, the gap 4 between the stringer 1 and the rib 2 is closed. Note that, other gap portions are closed by using sealant, adapter, etc. as will be explained in detail for embodiments described later.

There is a case in which each structural component (the stringers 1, the rib 2) is deformed. As a result of deformation, a load is applied to the fuel tank dam 7. By the load, there is a possibility that a joint surface between the fuel tank dam 7 and each of the structural components (stringer 1, the rib 2) is destroyed. However, according to the above-mentioned configuration, since the elastic member 10 is provided between the first portion 8 and second portion 9, the load applied to the fuel tank dam 7 is absorbed and the destruction of the joint surface can be prevented.

In addition, in the fuel tank dam 7 according to the present embodiment, the sealing mechanism 13-1 is provided. Thereby, the sealing properties between the elastic member 10 and the first portion 8 are enhanced as compared to a case in which the elastic member 10 is merely sandwiched by the first portion 8. It is also true for the sealing properties between the elastic member 10 and the second portion 9. In other words, the sealing properties of the fuel tank dam 7 are further enhanced.

Next, configuration of each part will be explained in detail.

As shown in FIG. 4, the first portion 8 is bended so as to cover the stringer 1 when viewed from the front. Further, as shown in FIG. 3, the first portion 8 includes a first member 11-1 and a second member 12-1. The first member 11-1 is a portion which is joined to the stringer 1 at the lower surface, and has an approximately plate shape. The second member 12-1 is disposed on the upper surface of the first member 11-1, and has an approximately plate shape. The first member 11-1 and the second member 12-1 are joined to each other via, for example, a sealant. Note that the first member 11-1 and the second member 12-1 sandwich one end of the elastic member 10 to support the elastic member 10.

On the other hand, as shown in FIG. 4, the second portion 9 has a shape for surrounding the first portion 8 via the gap to be closed by the elastic member 10 when viewed from the front. As shown in FIG. 3, the second portion 9 has a first member 11-2 and a second member 12-2 like the first portion 8. The first member 11-2 has an approximately plate shape, and is joined to the rib 2 at the lower surface. The second member 12-2 also has an approximately plate shape, and is disposed on the first member 11-2. The other end of the elastic member 10 is sandwiched between the first member 11-2 and the second member 12-2, and the other end of the elastic member is supported by the first member 11-2 and the second member 12-2.

Note that the first member 11-1 and the first member 11-2 are continuous at an end portion (see FIG. 4) in a case in which it is viewed from the front, and they constitute one member as a whole. Similarly, the second member 12-1 and the second member 12-2 are continuous at an end portion in a case in which it is viewed from the front, and they constitute one member as a whole. That is, the fuel tank dam 7 has a structure in which the elastic member 10 is sandwiched between the first member 11 (11-1, 11-2) and the second member 12 (12-1, 12-2) and has a three layer structure.

Figure 5:
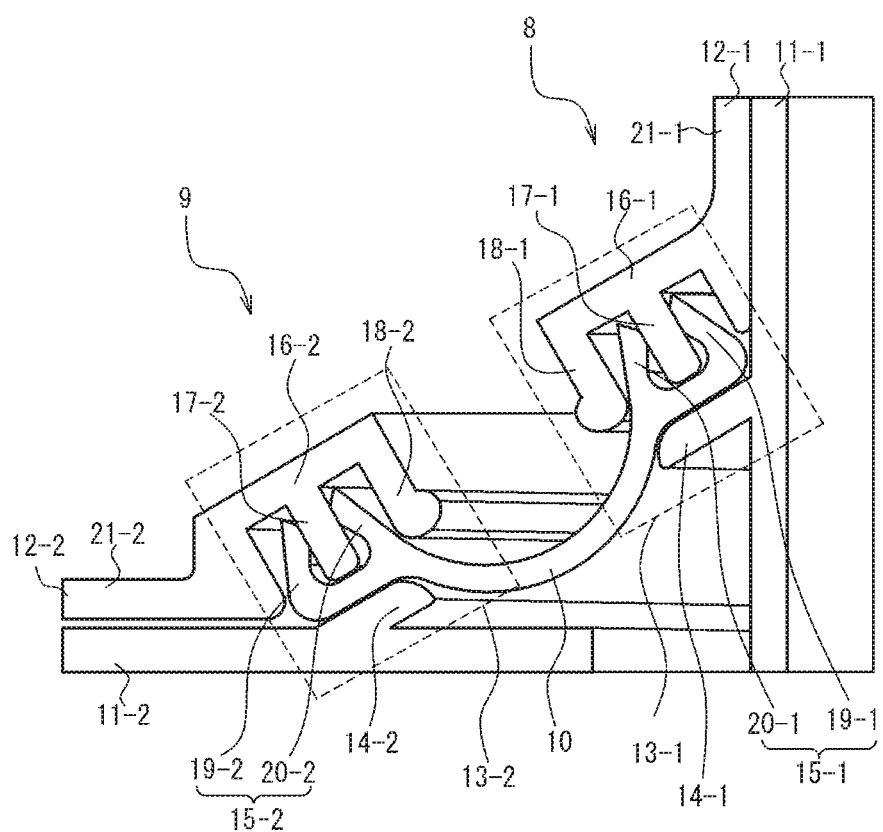
FIG. 5 is a schematic view of a sealing mechanism.

Next, the sealing mechanisms 13 (13-1, 13-2) will be explained. FIG. 5 is the schematic view of the sealing mechanisms 13 (13-1, 13-2).

The sealing mechanism 13-1 is formed by the one end of the elastic member 10 and a part of the first portion 8. Similarly, the seal mechanism 13-2 is formed by the other end of the elastic member 10 and a part of the second portion 9.

The sealing mechanism 13-1 includes a lip seal portion 15-1 which is formed at the one end of the elastic member 10. The lip seal portion 15-1 includes a first lip seal portion 19-1 and a second lip seal portion 20-1. The first lip seal portion 19-1 and the second lip seal portion 20-1 sandwich a part of the first portion 8.

More specifically, the sealing mechanism 13-1 includes a stopper portion 14-1, a first extending portion 16-1, a second extending portion 17-1, and a third extending 18-1 in addition to the lip seal portion 15-1.

The stopper portion 14-1 is a part of the first member 11-1, and protrudes from the upper surface of the first member 11-1 (a surface opposite to the joint surface to be joined to the stringer 1) toward a second portion side.

The first extending portion 16-1 is formed in the second member 12-1. Note that a portion contacting the first member 11-1 (a contact portion 21-1) is formed in the second member 12-1. The first extending portion 16-1 extends from an end of the contact portion 21-1 such that a space is formed between the first extending portion 16-1 and the first member 11-1 (more specifically, the stopper portion 14-1). More specifically, the first extending portion 16-1 extends so as to oppose the first member 11-1 (the stopper portion 14-1).

The second extending portion 17-1 extends from the first extending portion 16-1 toward the first member 11-1 (the stopper portion 14-1). The above-mentioned first lip seal portion 19-1 and the second lip seal portion 20-1 sandwich the second extending portion 17-1.

The third extending portion 18-1 extends, on a tip side of the second extending portion 17-1, from the first extending portion 16-1 toward the first member 11-1. The one end of the elastic member 10 (root portion of the lip seal portion 15-1) is sandwiched between the third extending portion 18-1 and the stopper portion 14-1, and is supported by the third extending portion 18-1 and the stopper portion 14-1.

Note that the third extending portion 18-1 may not be necessarily provided.

Note that the sealing mechanism 13-2 has the same configuration as the sealing mechanism 13-1. That is, the sealing mechanism 13-2 includes a lip seal portion 15-2, a stopper portion 14-2, a first extending portion 16-2, a second extending portion 17-2, and a third extending portion 18-2. The second member 12-2 has a contact portion 21-2, and the first extending portion 16-2 extends from the contact portion 21-2 such that a space is formed between the first extending portion 16-2 and the first member 11-2 (the stopper portion 14-2). The lip seal portion 15-2 has a first lip seal portion 19-2 and a second lip seal portion 20-2. The second extending portion 17-2 is sandwiched between the first lip seal portion 19-2 and the second lip seal portion 20-2. The third extending portion 18-2 and the stopper portion 14-2 sandwich the other end of the elastic member 10, and support the other end of the elastic member 10.

When adopting the above-mentioned configuration, high sealing properties can be obtained since the lip seal portion 15 (15-1, 15-2) sandwiches the second extending portion 17 (17-1, 17-2). There is a case in which the fuel tank dam 7 is disposed at, for example, a boundary portion between the fuel tanks. In such a case, there is a case in which a pressure difference is generated between both sides of the fuel tank dam 7. As a result, there is a case in which a force is applied to the elastic member 10 in a direction in which seal surfaces are separated. However, according to the present embodiment, the lip seal portion 15 (15-1, 15-2) sandwiches the second extending portion 17 (17-1, 17-2). Therefore, even when the force is applied to one portion of the first lip seal portion 19 (19-1, 19-2) and the second lip seal portion 20 (20-1, 20-2) so that the one portion is separated from the second extending portion 17 (17-1,17-2), a force is applied to the other lip seal portion so that the other lip seal portion is pushed toward the second extending portion 17 (17-1, 17-2). Thus, regardless of the pressure difference between both sides of the fuel tank dam 7, it is possible to maintain a sealing function.

Furthermore, it is conceivable to apply a sealant (adhesive) and so on between the elastic member 10 and the first portion 8 (or the second portion 9) in order to realize the sealing function. In the present embodiment, the sealant may be applied between the end portion of the elastic member 10 and the first portion 8 (or the second portion 9). However, depending on a type of sealant, there is a possibility that an inner portion of the fuel tank is contaminated. In the present embodiment, since the lip seal portion 15 (15-1, 15-2) is provided, the sealant function can be realized without using the sealant and it is possible to prevent the contamination of the fuel tank.

<Each Part of Constituent Material>

Next, a constituent material of the fuel tank dam 7 will be explained.

As the elastic member 10, it is possible to use, for example, a rubber material. As the rubber material, it is possible to use, for example, fluoro-silicone rubber, NBR (Nitrile butadiene rubber), hydrin rubber, hydrogenated nitrile rubber, another general rubber and so on.

As the first member 11 (11-1, 11-2) and the second member 12 (12-1, 12-2), it is possible to use, for example, a plastic material. As such a plastic material, it is possible to use, for example, nylon, ultra high molecular weight polyethylene, polyacetal and the like.

As the sealant applied to each member or between members, it is possible to use, for example, polysulfide sealant, another general sealant.

<Alternative Embodiment>

Next, an alternative embodiment of the present embodiment will be explained. In the above-mentioned embodiment, the explanation has been provided about the case in which the second member 12 (12-1, 12-2) has the first extending portion 16 (16-1, 16-2), the second extending portion 17 (17-1, 17-2), and the third extending portion 18 (18-1, 18-2). However, these configurations may be included in the first member 11 (11-1, 11-2) rather than in the second member 12 (12-1, 12-2). In the alternative embodiment, explanation will be provided in a case in which the first member 11 (11-1, 11-2) has the first extending portion 16 (16-1, 16-2), the second extending portion 17 (17-1, 17-2), and the third extending portion 18 (18-1, 18-2).

Figure 6:
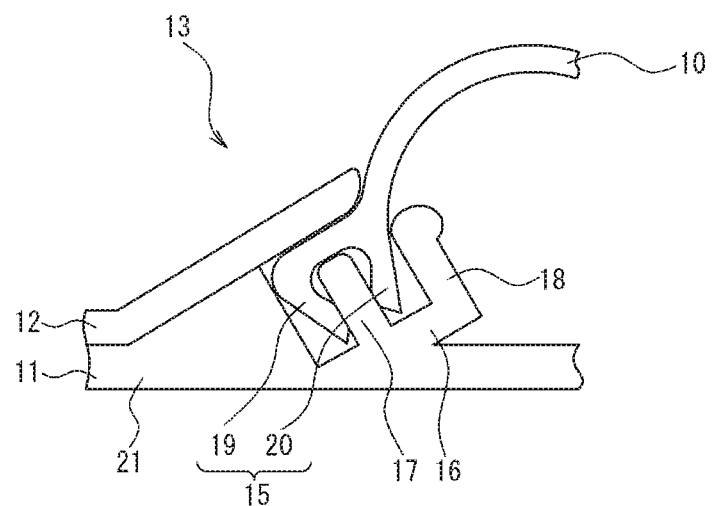
FIG. 6 is a schematic view of a sealing mechanism portion according to an alternative embodiment of the first embodiment.

FIG. 6 is the schematic view for illustrating a part of the sealing mechanism 13 of the fuel tank dam according to the present alternative embodiment. Note that, in the following explanation, for the purpose of simplifying the explanation, without distinguishing between the sealing mechanism 13-1 and the sealing mechanism 13-2, the sealing mechanism 13 will be explained as the sealing mechanism 13-1 or the sealing mechanism 13-2. It is true of the first extending portion 16 (16-1, 16-2), the second extending portion 17 (17-1 and 17-2) and the like.

As shown in FIG. 6, in the present alternative embodiment, the first member 11 rather than the second member 12 has the first extending portion 16, the second extending portion 17, and the third extension portion 18. The first extending portion 16 extends from the contact portion (contact portion 21) of the first member 11 contacting the second member 12 so as to face the second member 12. Between the first extending portion 16 and the second member 12, the space is formed.

The second extending portion 17 extends from the first extending portion 16 toward the second member 12. Like the above-mentioned embodiment, the first lip seal portion 19 and the second lip seal portions 20 sandwich the second extending portion 17.

The third extension portion 18 extends, on a tip side of the second extending portion 17, from the first extending portion 16 toward the second member 12. The end portion of the elastic member 10 is sandwiched between the third extending portion 18 and the second member 12 and is supported by the third extending portion 18 and the second member 12.

Regarding other respects, it is possible to adopt the same configuration as that of the above-mentioned embodiment. Therefore, detailed explanation is omitted.

Even when adopting the configuration of the alternative embodiment, it is possible to obtain the high sealing properties like the above-mentioned embodiment.

Second Embodiment

Subsequently, the second embodiment will be explained. In this embodiment, configuration of the sealing mechanism 13 is changed from the first embodiment. Regarding other respects, since it is possible to adopt the same configuration as that of the first embodiment, detailed explanation is omitted.

Figure 7:
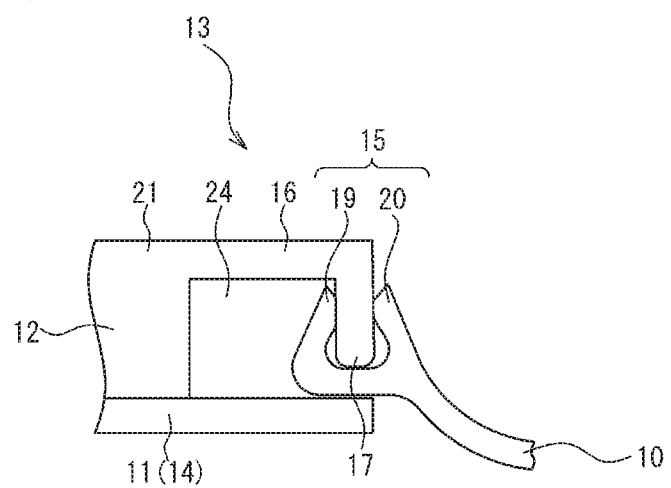
FIG. 7 is a schematic view of the sealing mechanism according to a second embodiment.

FIG. 7 is the schematic view of the sealing mechanism 13 according to the present embodiment. As shown in FIG. 7, the sealing mechanism 13 has the first extending portion 16 and the second extending portion 17. However, the third extending portion 18 (see FIG. 5) is not provided. The first lip seal portion 19 and the second lip seal portion 20 sandwich the second extending portion 17. In addition, the elastic member 10 is sandwiched between the second extending portion 17 and the first member 11 at a region between the first lip seal portion 19 and the second lip seal portion 20, and is supported by the second extending portion 17 and the first member 11.

Even in the case in which the third extending portion 18 is not provided like the present embodiment, it is possible to obtain the high sealing properties by adopting the lip seal portion 15.

Note that, in the present embodiment, the first member 11 rather than the second member 12 may have the first extending portion 16 and the second extending portion 17 like the alternative embodiment of the first embodiment.

Third Embodiment

Next, the third embodiment will be explained. In this embodiment, configuration of the sealing mechanism 13 is changed from the second embodiment. Regarding other respects, since it is possible to adopt the same configuration as that of the second embodiment, detailed explanation is omitted.

Figure 8:
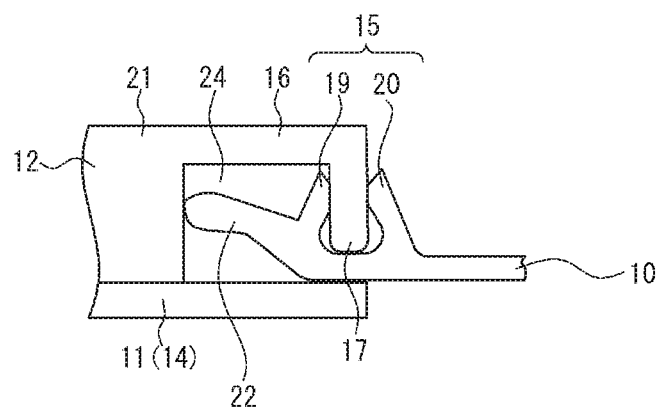
FIG. 8 is a schematic view of the sealing mechanism according to a third embodiment.

FIG. 8 is the schematic view for illustrating the sealing mechanism 13 according to the present embodiment. As shown in FIG. 8, in the present embodiment, a support portion 22 is added to the sealing mechanism 13.

In the present embodiment, the first lip seal portion 19 is disposed on the inner side of the second extending portion 17 in the space 24 formed between the first extending portion 16 and the first member 11. On the other hand, the second lip seal portion 20 is disposed on the outer side of the second extending portion 17, and the second extending portion 17 is sandwiched between the second lip seal portion 20 and the first lip seal portion 19.

The support portion 22 is a part of the elastic member 10. The support portion 22 is disposed between the first lip seal portion 19 and a wall surface of the space 24. The first lip seal portion 19 is pushed against the second extending portion 17 by the support portion 22.

According to the present embodiment, since the first lip seal portion 19 is pushed against the second extending portion 17 by the support portion 22, it is possible to seal between the first lip seal portion 19 and the second extending portion 17 more reliably. Thereby, the first lip seal portion 19 is hardly detached from the second extending portion 17, and the sealing properties are further enhanced.

Note that, in the present embodiment, the first member 11 rather than the second member 12 may have the first extending portion 16 and the second extending portion 17 like the alternative embodiment of the first embodiment.

Further, in the present embodiment, the third extending portion 18 (see FIG. 5) may be added like the first embodiment.

Fourth Embodiment

Next, the fourth embodiment will be explained. In this embodiment, configuration of the sealing mechanism 13 is changed from the third embodiment. Regarding other respects, since it is possible to adopt the same configuration as that of the third embodiment, detailed explanation is omitted.

Figure 9:
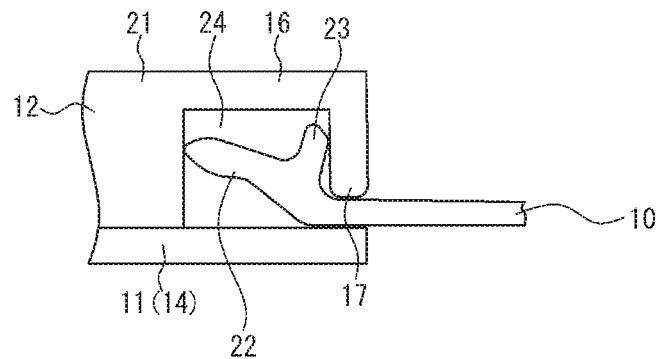
FIG. 9 is a schematic view of the sealing mechanism according to a fourth embodiment.

FIG. 9 is the schematic view for illustrating the sealing mechanism 13 according to the present embodiment. As shown in FIG. 9, in the present embodiment, the second lip seal portion 20 (see FIG. 8) is omitted from the third embodiment. That is, the elastic member 10 has a seal portion 23 (corresponding to the first lip seal portion 19 according to the third embodiment), and the support portion 22. The seal portion 23 and the support portion 22 are disposed on the inner side of the second extending portion 17 in the space 24 between the first extending portion 16 and the first member 11. The support portion 22 is disposed between the seal portion 23 and the wall surface of the space 24 such that the seal portion 23 is pushed against the second extending portion 17.

When adopting the configuration of this modified example, it is possible to push the seal portion 23 against the second extending portion 17 since the support portion 22 is provided. Therefore, it is possible to enhance the sealing properties even if the second lip seal portion 20 is not provided.

Note that, in the present embodiment, the first member 11 rather than the second member 12 may have the first extending portion 16 and the second extending portion 17 like the alternative embodiment of the first embodiment.

Further, in the present embodiment, the third extending portion 18 (see FIG. 5) may be added like the first embodiment.

Fifth Embodiment

Subsequently, the fifth embodiment will be explained. In this embodiment, configuration of the support portion 22 is changed from the third embodiment. Regarding other respects, since it is possible to adopt the same configuration as that of the third embodiment, detailed explanation is omitted.

Figure 10:
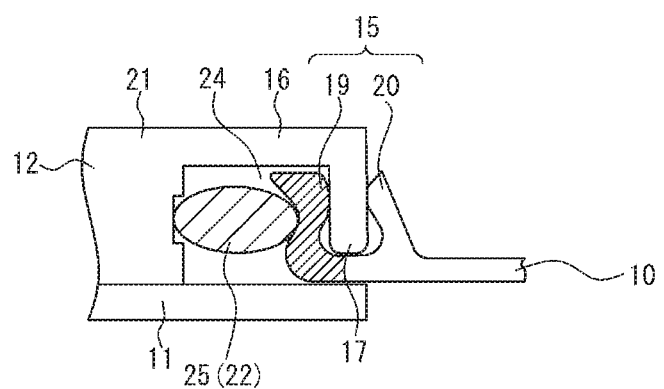
FIG. 10 is a schematic view of the sealing mechanism according to a fifth embodiment.

FIG. 10 is the schematic view for illustrating the sealing mechanism 13 according to the present embodiment. In the present embodiment, the support portion 22 includes a support member 25 provided separately from the elastic member 10. The support member 25 is disposed in the space 24. The support member 25 is, for example, an elastic body such as rubber. The support member 25 is disposed between the first lip seal portion 19 and the wall surface of the space 24 such that the first lip seal portion 19 is pushed against the second extending portion 17.

When adopting the configuration of this modified example, it is possible to push the first lip seal portion 19 against the second extending portion 17 since the support member 25 is provided, and it is possible to enhance the sealing properties.

Note that, in the present embodiment, the first member 11 rather than the second member 12 may have the first extending portion 16 and the second extending portion 17 like the alternative embodiment of the first embodiment.

Further, in the present embodiment, the third extending portion 18 (see FIG. 5) may be added like the first embodiment.

Moreover, in the present embodiment, the second lip seal portion 20 may be omitted like the fourth embodiment.

Sixth Embodiment

Subsequently, the sixth embodiment will be explained. In this embodiment, configuration of the support portion 22 is changed from the third embodiment. Regarding other respects, since it is possible to adopt the same configuration as that of the third embodiment, detailed explanation is omitted.

Figure 11:
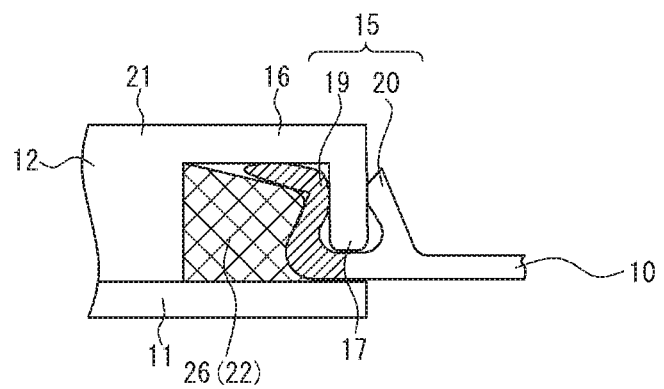
FIG. 11 is a schematic view of the sealing mechanism according to a sixth embodiment.

FIG. 11 is the schematic view for illustrating the sealing mechanism 13 according to the present embodiment. In the present embodiment, the support portion 22 includes a sealant portion 26 which is constituted by, for example, a curable type sealant etc. The sealant portion 26 is filled between the first lip seal portion 19 and the wall surface of the space 24. Thereby, the first lip seal portion 19 is pushed against the second extending portion 17.

When adopting the configuration of this modified example, it is possible to push the first lip seal portion 19 against the second extending portion 17 since the sealant portion 26 is provided, and it is possible to enhance the sealing properties.

Note that, in the present embodiment, the first member 11 rather than the second member 12 may have the first extending portion 16 and the second extending portion 17 like the alternative embodiment of the first embodiment.

Further, in the present embodiment, the third extending portion 18 (see FIG. 5) may be added like the first embodiment.

Moreover, in the present embodiment, the second lip seal portion 20 may be omitted like the fourth embodiment.

Seventh Embodiment

Subsequently, the seventh embodiment will be explained. In this embodiment, configuration of the sealing mechanism 13 is changed from the first embodiment. Regarding other respects, since it is possible to adopt the same configuration as that of the first embodiment, detailed explanation is omitted.

Figure 12:
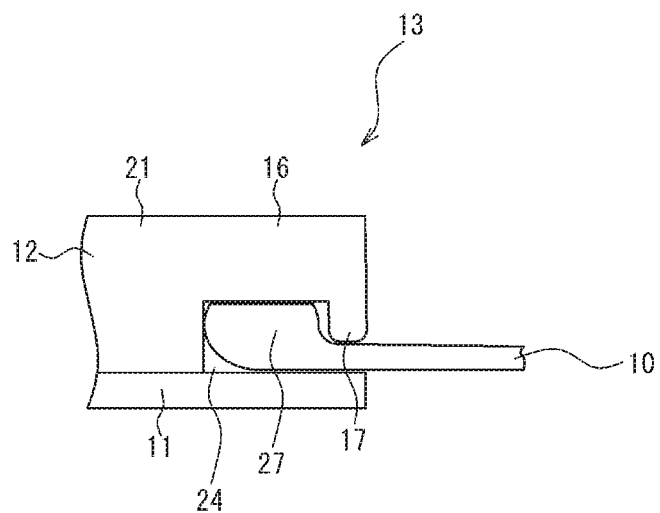
FIG. 12 is a schematic view of the sealing mechanism according to a seventh embodiment.

FIG. 12 is the schematic view for illustrating the sealing mechanism 13 according to the present embodiment. As shown in FIG. 12, the sealing mechanism 13 includes the first extending portion 16, the second extending portion 17, and a compressed portion 27. The first extending portion 16 is included in the second member 12. The first extending portion 16 extends from the contact portion (contact portion 21) contacting the first member 11 such that the space 24 is formed between the first extending portion 16 and the first member 11. The second extending portion 17 extends from the first extending portion 16 toward the first member 11. The compressed portion 27 is formed at the one end of the elastic member 10, and swells than the other portion of the elastic member 10. The compressed portion 27 is compressed by being sandwiched between the extending portion 16 and the first member 11.

According to the present embodiment, since the compressed portion 27 is provided, it is possible to enhance the sealing properties at a portion between the elastic member 10 and each portion (the first portion 8, the second portion 9), and it is possible to enhance the sealing properties of the fuel tank dam 7.

Note that, in the present embodiment, the first member 11 rather than the second member 12 may have the first extending portion 16 and the second extending portion 17 like the alternative embodiment of the first embodiment.

Eighth Embodiment

Subsequently, the eighth embodiment will be explained. In this embodiment, configuration of the sealing mechanism 13 is changed from the first embodiment. Regarding other respects, since it is possible to adopt the same configuration as that of the first embodiment, detailed explanation is omitted.

Figure 13:
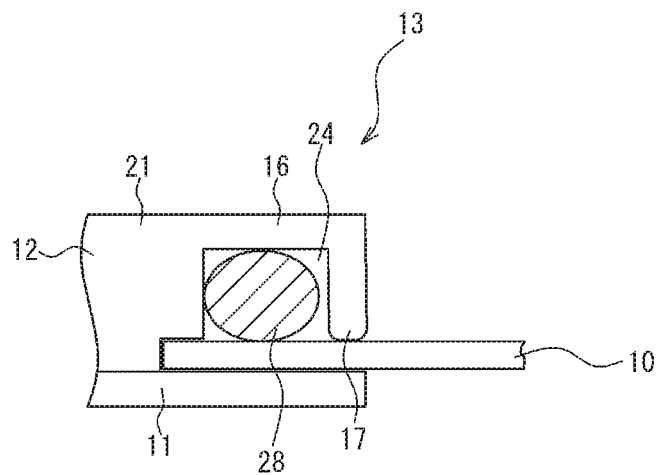
FIG. 13 is a schematic view of the sealing mechanism according to an eighth embodiment.

FIG. 13 is the schematic view for illustrating the sealing mechanism 13 according to the present embodiment. As shown in FIG. 13, the sealing mechanism 13 includes the first extending portion 16, the second extending portion 17 and a compressed member 28. The first extending portion 16 is included in the second member 12. The first extending portion 16 extends from the contact portion (contact portion 21) contacting the first member 11 such that the space 24 is formed between the first extending portion 16 and the first member 11. The second extending portion 17 extends from the first extending portion 16 toward the first member 11.

The compressed member 28 is constituted by, for example, a part of an O-ring made of rubber, and is disposed in the space 24. One end of the elastic member 10 is disposed in the space 24. The compressed member 28 is compressed and disposed between the one end of the elastic member 10 and the first extending portion 16. The one end of the elastic member 10 is sandwiched between the first member 11 and second member 12 via the compressed member 28.

When adopting the configuration of this embodiment, it is possible to enhance the sealing properties at both end portions of the elastic member 10 since the compressed member 28 is provided, and it is possible to enhance the sealing properties of the fuel tank dam 7.

Note that, in the present embodiment, the first member 11 rather than the second member 12 may have the first extending portion 16 and the second extending portion 17 like the alternative embodiment of the first embodiment.

Ninth Embodiment

Subsequently, the ninth embodiment will be explained. In this embodiment, configuration of the sealing mechanism 13 is changed from the first embodiment. Regarding other respects, since it is possible to adopt the same configuration as that of the first embodiment, detailed explanation is omitted.

Figure 14:
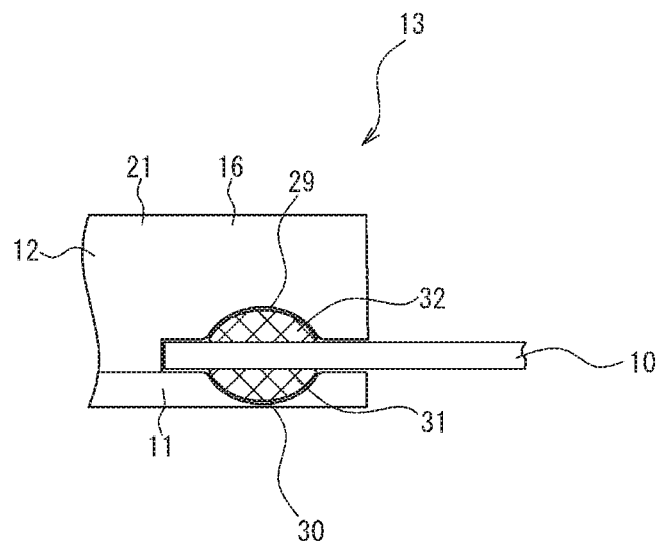
FIG. 14 is a schematic view of the sealing mechanism according to a ninth embodiment.

FIG. 14 is the schematic view for illustrating the sealing mechanism 13 according to the present embodiment. The sealing mechanism 13 includes a recess 29, a recess 30, a first sealant portion 31, and a second sealant portion 32. The recess 30 is formed in the upper surface of the first member 11. The recess 29 is formed in the lower surface of the second member 12. The recess 30 and the recess 29 respectively are provided in portions which sandwich the elastic member 10. The first sealant portion 31 is filled in the recess 30. The first sealant portion 31 seals between the elastic member 10 and the first member 11. The second sealant portion 32 is filled in the recess 29. The second sealant portion 32 seals between the elastic member 10 and second member 12.

According to the present embodiment, at two positions, that is the first sealant 31 portion and the second sealant portion 32, the seal is provided between the elastic member 10 and each portion (the first portion 8, the second portion 9). Therefore, it is possible to enhance the sealing properties of the fuel tank dam 7.

Note that, as the sealant used for the first sealant portion 31 and the second sealant portion 32, curable type sealant or non-curable sealant is used. For example, as the material constituting each sealant portion (31, 32), it is possible to use the sealant that is described in the first embodiment.

Tenth Embodiment

Subsequently, the tenth embodiment will be explained. In this embodiment, configuration of the sealing mechanism 13 is changed from the first embodiment. Regarding other respects, since it is possible to adopt the same configuration as that of the first embodiment, detailed explanation is omitted.

Figure 15:
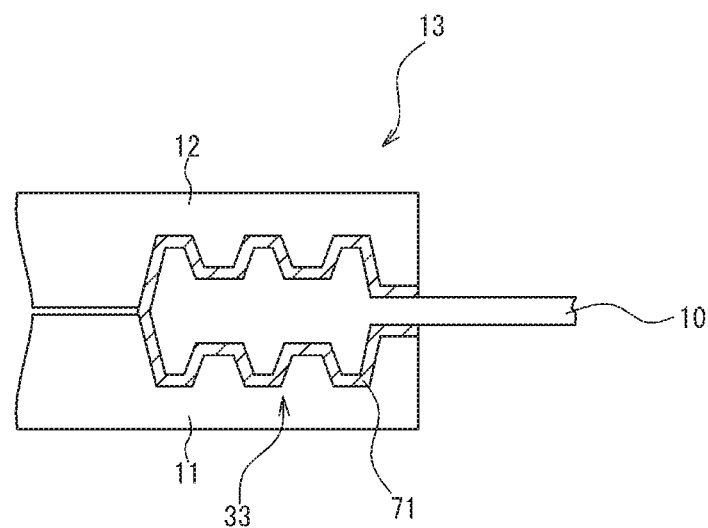
FIG. 15 is a schematic view of the sealing mechanism according to a tenth embodiment.

FIG. 15 is the schematic view for illustrating the sealing mechanism 13 according to the present embodiment. The sealing mechanism 13 includes a labyrinth seal structure 33. The labyrinth seal structure 33 is formed by each portion (the first section 8, the second portion 9) and a shape of the end portion of the elastic member 10.

More specifically, the labyrinth seal structure 33 includes, an uneven structure formed in the upper surface of the first member 11, an uneven structure formed in the lower surface of the second member 12, and an uneven structure formed at the end portion of the elastic member 10. The uneven structure formed in the elastic member 10 is fitted to the uneven structures formed in the first member 11 and the second member 12. Note that a region between the uneven structure of the elastic member 10 and the uneven structures of the first member 11 and the second member 12 is filled with a sealant 71.

When adopting the configuration of the present embodiment, it is possible to enhance the sealing properties between the elastic member 10 and each portion (the first portion 8, the second portion 9) since the labyrinth seal structure 33 is provided, and it is possible to enhance the sealing properties of the fuel tank dam 7.

Eleventh Embodiment

Subsequently, the eleventh embodiment will be explained. In this embodiment, configuration of the sealing mechanism 13 is changed from the first embodiment. Regarding other respects, since it is possible to adopt the same configuration as that of the first embodiment, detailed explanation is omitted.

Figure 16:
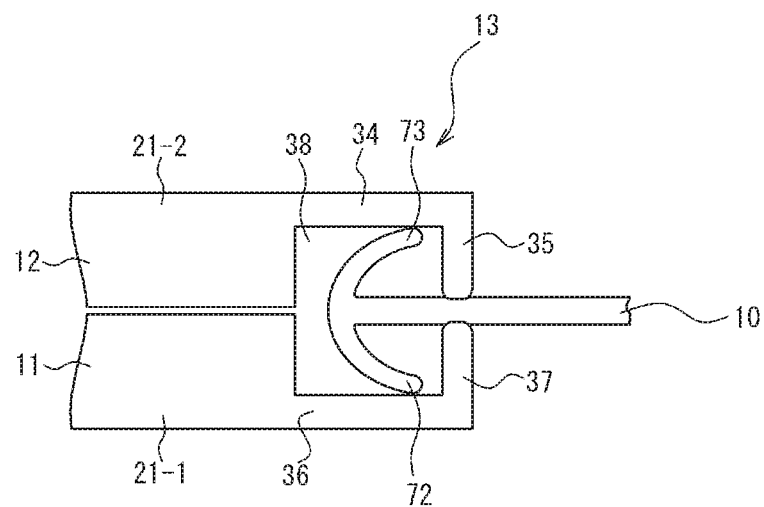
FIG. 16 is a schematic view of the sealing mechanism according to an eleventh embodiment.

FIG. 16 is the schematic view for illustrating the sealing mechanism 13 according to the present embodiment. The sealing mechanism 13 includes a first member extending portion 36, a first member holding portion 37, a second member extending portion 34, a second member holding portion 35, a first lip seal portion 72, and a second lip seal portions 73.

The first member extending portion 36 is included in the first member 11. In the first member 11, a portion (a first member contact portion 21-1) contacting the second member 12 is formed, and the first member extending portion 36 extends from the first member contact portion 21-1 such that a space 38 is formed between the first member extending portion 36 and the second member 12. The first member holding portion 37 extends from the first member extending portion 36 toward the second member 12.

The second member extending portion 34 is included in the second member 12. In the second member 12, a portion (a second member contact portion 21-2) contacting the first member 11 is formed, and the second member extending portion 34 extends from the second member contact portion 21-2 such that the space 38 is formed between the second member extending portion 34 and the first member 11. The second member extending portion 34 extends so as to face the first member extending portion 36. The second member holding portion 35 extends from the second member extending portion 34 toward the first member 11.

The elastic member 10 is sandwiched between the first member holding portion 37 and the second member holding portion 35.

The first lip seal portion 72 and the second lip seal portions 73, respectively, are formed in the elastic member 10. The first lip seal portion 72 and the second lip seal portion 73 are disposed in the space 38. The first lip seal portion 72 is pushed against the first member 11 (the first member extending portion 36) in the space 38. The second lip seal portion 73 is pushed against the second member 12 (the second member extending portion 34) in the space 38.

According to the present embodiment, the first lip seal portion 72 seals between the elastic member 10 and the first member 11. In addition, the second lip seal portion 73 seals between the elastic member 10 and second member 12. Since the seals are formed at two locations, it is possible to enhance the sealing properties of the fuel tank dam 7.

In addition, like the first embodiment, even when a force is applied to one portion of the first lip seal portion 72 and the second lip seal portion 73 so that the one portion is separated from the first member or the second member, a force is applied to the other lip seal portion so that the other lip seal portion is pushed against the first member 11 or the second member 12. Therefore, regardless of the pressure difference between both sides of the fuel tank dam 7, it is possible to maintain the sealing function.

Twelfth Embodiment

Subsequently, the twelfth embodiment will be explained. In this embodiment, the closing method using the fuel tank dam 7 is devised.

In the present embodiment, prior to fixing the fuel tank dam 7 to the stringer 1 (the first structural component), firstly, an adapter is placed on the stringer 1. The adapter is used to fill a gap formed between the stringer 1 and the fuel tank dam 7. That is, the adapter is placed such that an outer shape of the stringer 1 becomes a shape conformable to the fuel tank dam 7. Then, the fuel tank dam 7 is fixed to the stringer 1 such that the first portion 8 covers the stringer 1 via the adapter.

<I-Cross-Section Stringer>

Figure 17:
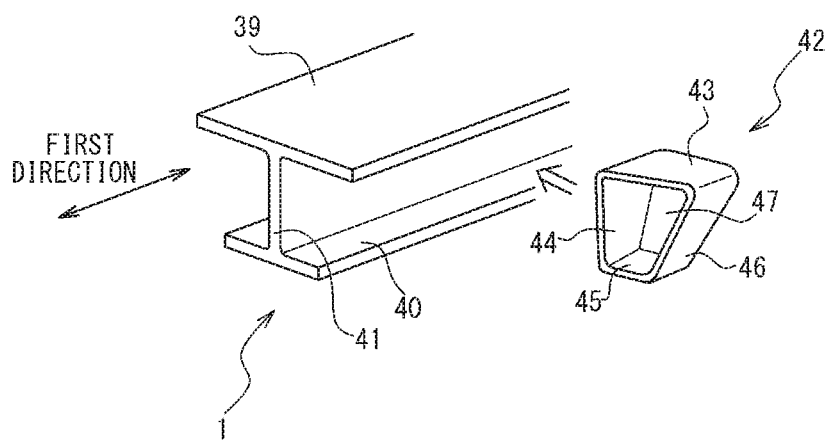
FIG. 17 is a perspective view for schematically illustrating an example of a stringer and an adapter.

FIG. 17 is the perspective view for schematically illustrating an example of the stringer 1 and the adapter 42. The stringer 1 shown in FIG. 17 is a so-called I-cross-section stringer. The stringer 1 includes a first plate portion 39, a second plate portion 40, and a connecting portion 41.

The first plate portion 39 has a flat plate shape, and is a portion that is bonded to the skin 3. The second plate portion 40 is disposed opposite to the first plate portion 39, and has a flat plate shape. The connecting portion 41 is a portion coupling the first plate portion 39 and the second plate portion 40 to each other. That is, the connecting portion 41 is joined to the first plate portion 39 at one end and is joined to the second plate portion 40 at the other end. In addition, the connecting portion 41 extends so as to connect a central portion of the first plate portion 39 and a central portion of the second plate portion 40 when viewed from a direction along the first direction. The connecting portion 41 has a flat plate shape, and is perpendicular to the first plate portion 39.

The adapter 42 is placed so as to fill a recess formed by the first plate portion 39, the second plate portion 40 and the connecting portion 41. More specifically, the adapter 42 has a surface 44, a surface 43, a surface 45, a surface 46, and a surface 47. The surface 44 is a portion that is joined to the connecting portion 41. The surface 43 is a portion that is joined to the first plate portion 39. The surface 45 is a portion that is joined to the second plate portion 40. The surface 46 connects an end portion of the surface 43 and an end portion of the surface 45. When viewed from the front (when viewed from the direction along the first direction), a closed region is formed by the surface 44, the surface 43, the surface 45, and the surface 46. The surface 47 is a bottom surface, and is arranged to close the region formed by the surface 44, the surface 43, the surface 45 and the surface 46 when viewed from the front.

Figure 18:
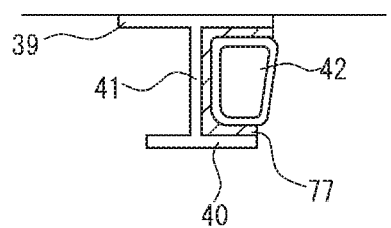
FIG. 18 is a front view of the stringer after the adapter has been arranged.

FIG. 18 is the front view for illustrating the stringer 1 after the adapter 42 is disposed. As shown in FIG. 18, the adapter 42 is bonded to the stringer 1 via a sealant 77. Note that, the adapter 42 and the stringer 1 may be joined by a fastener rather than the sealant 77 in order to increase the strength. Alternatively, using both the sealant 77 and the fastener, the adapter 42 may be joined to the stringer 1. Note that, in the example shown in FIG. 18, the adapter 42 is disposed in only one of the two recesses formed on both sides of the connecting portion 41. However, in practice, two adapters 42 are disposed in both of the recesses, respectively.

Figure 19:
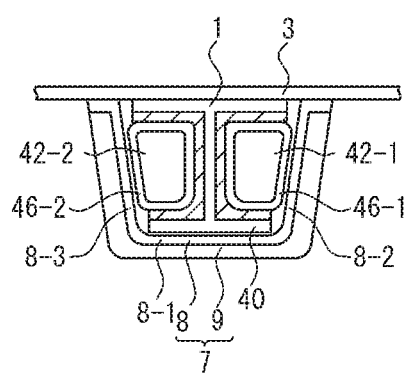
FIG. 19 is a front view of the stringer after the fuel tank dam is joined.

FIG. 19 is the front view for illustrating the stringer 1 after the fuel tank dam 7 is joined. As shown in FIG. 19, the adapters 42-1 and 42-2 are disposed on the stringer 1. The fuel tank dam 7 is joined to the stringer 1 such that the first portion 8 covers the stringer 1 via the adapters 42 (42-1, 42-2) That is, the first portion 8 is joined to the second plate portion 40 of the stringer 1, the surface 46-1 of the adapter 42-1 and the surface 46-2 of the adapter 42-2. The first portion 8 may be bent so as to form a part 8-1 corresponding to the second plate portion 40, a part 8-2 corresponding to the surface 46-1 and a part 8-3 corresponding to the surface 46-2, and may not be required to have a complex shape.

<J-Cross-Section Stringer>

There is a case in which a stringer having a shape other than the shape of the I-cross-section stringer is used as the stringer 1. In such a case, it is possible for an outer shape of the stringer 1 to conform to an outer shape of the fuel tank dam 7 (the first portion 8) by using the adapter 42. In the present example, a case in which a J-cross-section stringer is used as the stringer 1 will be explained.

Figure 20:
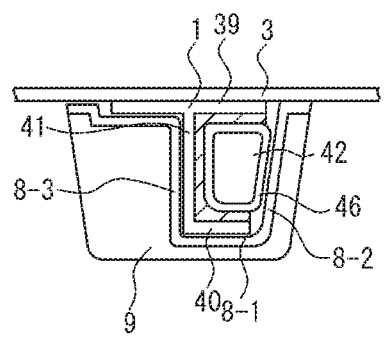
FIG. 20 is a view for illustrating an arrangement of the fuel tank dam when a J-cross-section stringer is used.

FIG. 20 is the view for illustrating an arrangement of the fuel tank dam 7 in the case in which the J-cross-section stringer is used as the stringer 1. As shown in FIG. 20, like the example shown in FIG. 17, the stringer 1 includes the first plate portion 39, the second plate portion 40, and the connecting portion 41. However, the connecting portion 41 is connected to an end portion of the second plate portion 40 rather than the central portion of the second plate portion 40.

Regarding the J-cross-section stringer, instead of forming the recesses on both sides of the connecting portion 41, one recess is formed on one side of the connecting portion 41. Thus, the adapter 42 is arranged only one side of the connecting portion 41.

As the fuel tank dam 7, it is possible to use the similar one with the example shown in FIG. 19. That is, the fuel tank dam 7 is joined to the second plate portion 40 at the part 8-1, is joined to the surface 46 of the adapter 42 at the part 8-2, and is joined to the connecting portion 41 at the part 8-3.

<Hat-Type Stringer>

Further, there is a case in which a hat-type stringer is used as the stringer 1.

Figure 21:
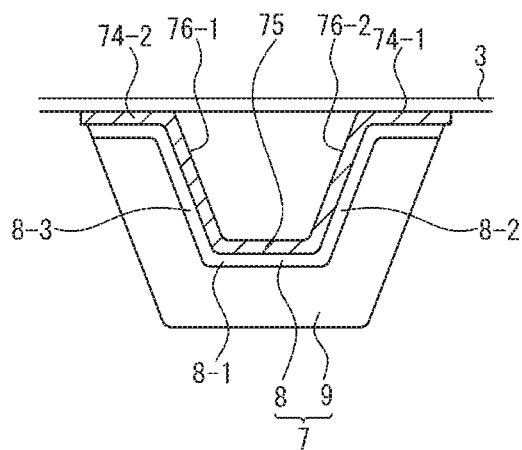
FIG. 21 is a view for illustrating an arrangement of the fuel tank dam when a hat-type stringer is used.

FIG. 21 is the view for illustrating the arrangement of the fuel tank dam 7 in the case in which the hat-type stringer is used as the stringer 1. As shown in FIG. 21, the stringer 1 includes a pair of first plate portions 74 (74-1, 74-2), a second plate portion 75 and a pair of side portions 76 (76-1, 76-2) The pair of first plate portions 74 (74-1, 74-2) is a portion which is to be joined to the skin 3. The second portion 75 is disposed at a position away from the skin 3, and is parallel to the pair of first plate portion 74 (74-1, 74-2). The pair of side portions 76 (76-1, 76-2), respectively, connects the inner end portion of the pair of first plate portions 74 (74-1, 74-2) and an end portion of the second plate portion 75. The pair of side portions (76-1, 76-2) extends such that distance between the pair of side portions (76-1, 76-2) becomes larger toward the skin 3.

In the case of using the hat-type stringer, it is not required to use the adapter 42. The fuel tank dam 7 is joined to the second plate portion 75 at the part 8-1, is joined to the side portion 76-2 at the part 8-2, and is joined to the side portion 76-1 at the part 8-3.

As described above, according to the present embodiment, by using the adapter 42 as needed, it is not required to create the fuel tank dam 7 having a complex shape as the fuel tank dam, and it is possible to reduce manufacturing costs.

Note that, in the present embodiment, the fuel tank dam 7 according to the above-mentioned embodiments may not necessarily be used. Another fuel tank dam may be used as long as it has configurations corresponding to the part 8-1, the part 8-2 and the part 8-3.

<Alternative Embodiment of Adapter>

Figure 22:
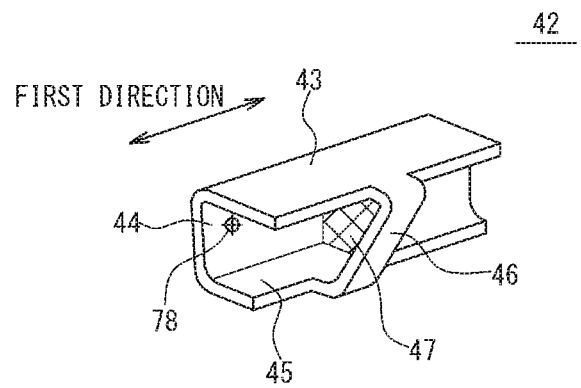
FIG. 22 is a perspective view for schematically illustrating the adapter according to an alternative embodiment.

Next, alternative embodiment of the adapter 42 will be explained. FIG. 22 is the perspective view for schematically illustrating the adapter 42 according to the alternative embodiment. In the adapter 42 according to the alternative embodiment, each surface (the surface 43, the surface 44, and the surface 45), which is joined to the stringer 1, is longer in the first direction than the surface 46. Other configurations are the same as those of the adapter 42 shown in FIG. 17. Note that a fastener hole 78 for fastening the stringer 1 and the adapter 42 together by a fastener is formed in the surface 44. Although sufficient sealing properties can be obtained without fastening the fastener, the fastener may be used.

By adopting the configurations according to the present alternative embodiment, it is possible to increase bonding area between the stringer 1 and the adapter 42, and it is possible to enhance the sealing properties.

13th Embodiment

Subsequently, the thirteenth embodiment will be explained. In this embodiment, configuration of the fuel tank dam 7 is changed. Regarding other respects, since it is possible to adopt the same configuration as that of the first embodiment, detailed explanation is omitted.

Figure 23:
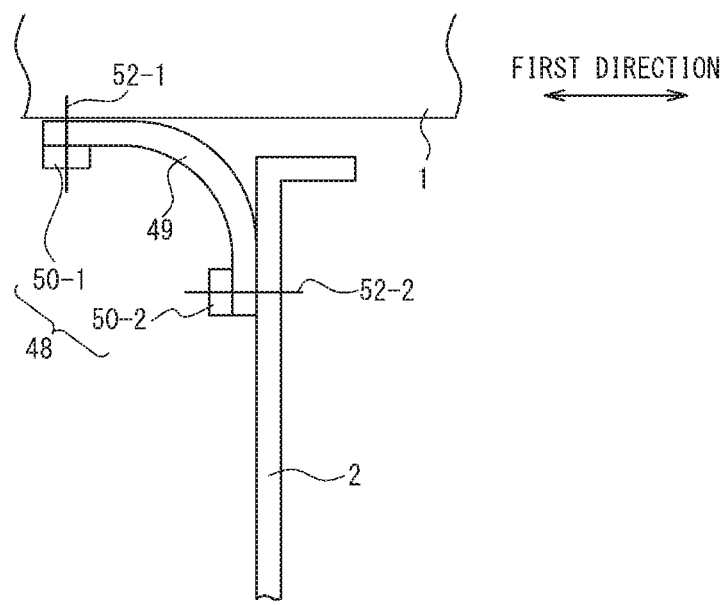
FIG. 23 is a cross-sectional view for schematically illustrating the fuel tank dam according to a thirteenth embodiment.

FIG. 23 is the cross-sectional view for schematically illustrating the fuel tank dam 48 according to the present embodiment. As shown in FIG. 23, the fuel tank dam 48 includes an elastic member 49, and retainer members 50 (50-1, 50-2) made of metal or resin.

The elastic member 49 is disposed so as to close the gap between the stringer 1 and the rib 2. More specifically, the elastic member 49 contacts the stringer 1 at one end, and contacts the rib 2 at the other end. As a material of the elastic member 49, it is possible to use the same material as that of the elastic member 10 described in the first embodiment.

The retainer member 50-1 is provided at one end of the elastic member 49, and is disposed such that the elastic member 49 is sandwiched between the retainer member 50-1 and the stringer 1. The retainer member 50-1 is provided for joining the elastic member 49 to the stringer 1 by a fastener 52-1. That is, the retainer member 50-1, the elastic member 49 and the stringer 1 are fastened by the fastener 52-1. Similarly, the retainer member 50-2 is provided at the other end of the elastic member 49, and the elastic member 49 is sandwiched between the retainer member 50-2 and the rib 2. The retainer member 50-2, the elastic member 49 and the rib 2 are fastened by the fastener 52-2.

Note that, as the retainer members 50 (50-1, 50-2), for example, a plastic material is used.

According to the present embodiment, the gap between the stringer 1 and the rib 2 is closed by two layer structure (the elastic member 49 and the retainer members 50-1, 50-2). Therefore, it is possible to further reduce the manufacturing costs.

14th Embodiment

Subsequently the fourteenth embodiment will be explained. In this embodiment, configuration of the fuel tank dam is changed. Regarding other respects, since it is possible to adopt the same configuration as that of the first embodiment, detailed explanation is omitted.

Figure 24:
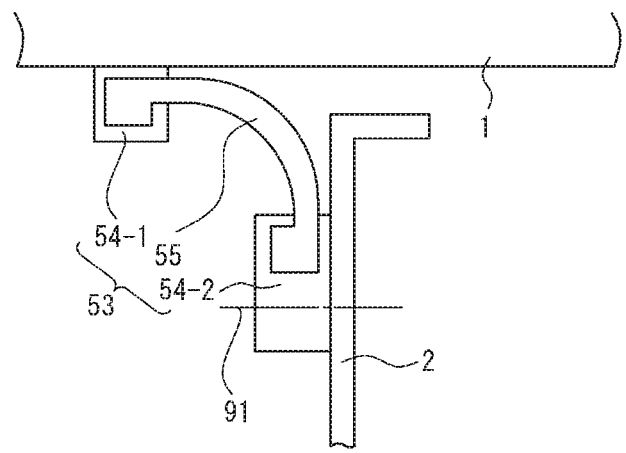
FIG. 24 is a cross-sectional view for schematically illustrating the fuel tank dam according to a fourteenth embodiment.

FIG. 24 is the cross sectional view for schematically illustrating the fuel tank dam 53 according to the present embodiment. As shown in FIG. 24, the fuel tank dam 53 includes a first resin member 54-1, a second resin member 54-2 and an elastic member 55. The second resin member 54-2 and the rib 2 are fastened by a fastener 91.

The first resin member 54-1 is a portion to be bonded to the stringer 1. The second resin member 54-2 is a portion to be bonded to the rib 2. The first resin member 54-1 and the second resin member 54-2 are bonded to the stringer 1 and the rib 2, respectively, via, for example, a sealant.

As a material of the elastic member 55, it is possible to use the same material as that of the elastic member 10 described in the first embodiment, and, for example, a rubber material may be used. The elastic member 55 is embedded in the first resin member 54-1 at one end, and is embedded in the second resin member 54-2 at the other end. The gap between the stringer 1 and the rib 2 is closed by the elastic member 55.

In manufacturing, the elastic member 55, the first resin member 54-1 and the second resin member 54-2 are joined together by integral molding.

According to the present embodiment, like the thirteenth embodiment, the gap between the stringer 1 and the rib 2 is closed by two layer structure (the elastic member 49 and the resin members 54-1, 54-2). Therefore, it is possible to further reduce the manufacturing costs.

In addition, the elastic member 55, the first resin member 54-1 and the second resin member 54-2 are joined by the integral molding. Therefore, it is possible to enhance the sealing properties at a joint portion between the elastic member 55 and the first resin member 54-1. It is true of the sealing properties between the elastic member 55 and the second resin member 54-2.

Alternative Example 1

Next, alternative example 1 of the present embodiment will be explained. In this alternative example, a structure of the joint portion between the elastic member 55 and each resin member 54 (54-1, 54-2) has been devised. Regarding other respects, it is possible to adopt the same configuration as that of the example shown in FIG. 24.

Figure 25:
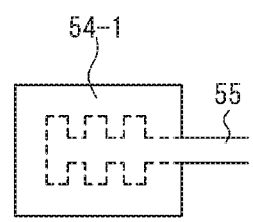
FIG. 25 is a schematic view for illustrating a joint portion between an elastic member and a first resin member according to a first alternative example of the fourteenth embodiment.

FIG. 25 is the schematic view for illustrating the joint portion between the elastic member 55 and the first resin member 54-1 according to the alternative example. As shown in FIG. 25, an uneven structure is formed at one end of the elastic member 55. The first resin member 54-1 covers the uneven structure. Although not shown in the drawings, it is true of the joint portion between the other end of the elastic member 55 and the second resin member 54-2.

According to this alternative example, since the uneven structure is provided, it is possible to improve the adhesion properties between the elastic member 55 and each resin member (54-1 and 54-2). Thus, it is possible to enhance the sealing properties of the fuel tank dam 53.

Alternative Example 2

Figure 26:
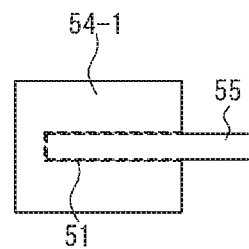
FIG. 26 is a schematic view for illustrating the joint portion between the elastic member and the first resin member according to a second alternative example of the fourteenth embodiment.

Next, alternative example 2 of the present embodiment will be explained. FIG. 26 is the schematic view for illustrating the joint portion between the elastic member 55 and the first resin member 54-1 according to the alternative example.

As shown in FIG. 26, a surface treatment portion 51 is formed at the end portion of the elastic member 55. The surface treatment portion 51 is a portion in which surface treatment such as roughening the surface is performed. It is true of the other end of the elastic member 55. Note that, ss the surface treatment, for example, satin finish is used.

In this alternative example, at the time of molding of the elastic member 55, the surface treatment is performed to both end portions, and the surface treatment portion 51 is formed. Then, each resin member 54 (54-1, 54-2) is disposed and formed to cover both ends of the elastic member 55.

According to this alternative example, since the surface treatment is applied to both ends of the elastic member 55, it is possible to improve the adhesion properties between the elastic member 55 and each resin member 54 (54-1, 54-2), and it is possible to enhance the sealing properties.

Note that the surface treatment portion 51 may be formed in each resin member 54 (54-1, 54-2) rather than the elastic member 55. In this case, firstly, at the time of molding of each resin member 54 (54-1, 54-2), the surface treatment is applied to a portion to be joined to the elastic member 55. Then, the elastic member 55 is molded so as to be embedded in each resin member 54 (54-1, 54-2).

15th Embodiment

Subsequently, the fifteenth embodiment will be explained. In this embodiment, configuration of the fuel tank dam 7 is changed. Regarding other respects, since it is possible to adopt the same configuration as that of the first embodiment, detailed explanation is omitted.

Figure 27A:
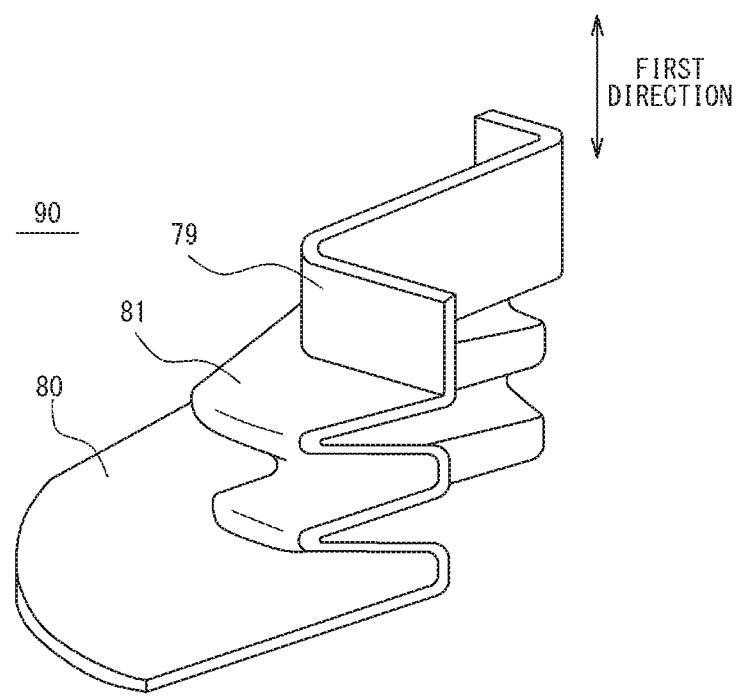
FIG. 27A is a perspective view for schematically illustrating the fuel tank dam according to a fifteenth embodiment.
Figure 27B:
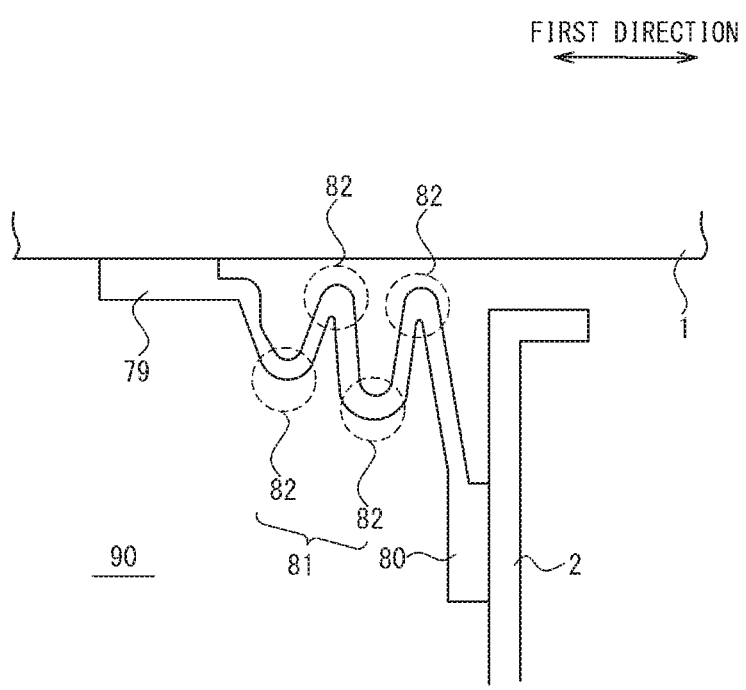
FIG. 27B is a cross-sectional view for schematically illustrating the fuel tank dam.

FIG. 27A is the perspective view for schematically illustrating the fuel tank dam 90 according to the present embodiment. In addition, FIG. 27B is the cross-sectional view for schematically illustrating the fuel tank dam 90. As shown in FIGS. 27A and 27B, the fuel tank dam 90 includes a first portion 79, a second portion 80, and a third portion 81. The first portion 79, the second portion 80 and the third portion 81 are formed integrally, for example, using a plastic material.

The first portion 79 is a portion to be joined to the stringer 1. The first portion 79 is bonded to the stringer 1 via, for example, a sealant.

The second portion 80 is a portion to be joined to the rib 2. The second portion 80 is bonded to the rib 2 via, for example, a sealant like the first portion 79. Note that the second portion 80 is fastened to the rib 2 by a fastener (not shown).

The third portion 81 is a portion coupling the first portion 79 and the second portion 80, and is provided so as to close a gap between the first portion 79 and the second portion 80.

Note that the third portion 81 includes a plurality of folded portions 82. That is, the third portion 81 has a bellows shape.

According to the present embodiment, since the third portion 81 has the bellows shape, a load is absorbed by the third portion 81 even when the load is applied in accordance with deformation of the rib 2 or the stringer 1. As a result, break of joint surface between the fuel tank dam 90 and each structural component (rib 2, stringer 1) can be prevented, and it is possible to enhance the sealing properties.

In connection with the above description, the following numbered statement will be disclosed.

[Statement 1]

A closing method comprising a step of closing a gap formed between a first structural component of a fuel tank and a second structural component of the fuel tank by a fuel tank dam, wherein the fuel tank dam comprises:

a first portion disposed on a first structural component side;

a second portion disposed on a second structural component side;

an elastic member supported by the first portion at one end while supported by the second portion at the other end, and closing a gap formed between the first portion and the second portion; and a sealing mechanism configured to seal between the first portion and the elastic member, wherein the step of closing a gap comprises:

a step of disposing the first portion on the first structural component; and a step of disposing the second portion on the second structural component.

[Statement 2]

The closing method according to statement 1, further comprising:

a step of disposing an adapter on the first structural component such that an outer shape of the first structural component becomes a shape conformable to the fuel tank dam, wherein the step of disposing the first portion on the first structural component comprises a step of disposing the first portion so as to cover the first structural component via the adapter.

[Statement 3]

The closing method according to statement 2, wherein the first structural component comprises:

a first plate portion to be joined to a skin and having a flat plate shape;

a second plate portion disposed opposite to the first plate portion and having a flat plate shape; and a connecting portion extending perpendicular to the first plate portion, connected to the first plate portion at one end, and connected to the second plate portion at the other end, wherein the adapter is disposed to fill a recess formed by the first plate portion, the second plate portion and the connecting portion.

The present invention has been described with reference to the embodiments 1 to 15. It should be noted that these embodiments are not independent from each other, and they can be combined as long as technical contradiction does not occur.

This application claims a priority based on Japanese Patent Application No. JP2013-188338. The disclosure of which is hereby incorporated by reference herein in its entirety.

The invention claimed is:

1. A fuel tank dam closing a gap formed between a first structural component and a second structural component comprising:

a first portion disposed on a first structural component side;

a second portion disposed on a second structural component side;

an elastic member supported by the first portion at one end while supported by the second portion at an other end, and closing a gap formed between the first portion and the second portion; and a sealing mechanism disposed to seal between the first portion and the elastic member, wherein the sealing mechanism comprises a lip seal portion of the elastic member, wherein the first portion comprises:

a first member disposed on the first structural component; and a second member disposed on the first member, and wherein the one end of the elastic member is sandwiched between the first member and the second member so as to be supported by the first member and the second member.

2. The fuel tank dam according to claim 1, wherein the lip seal portion comprises a first lip seal portion and a second lip seal portion which are configured to sandwich a part of the first portion.

3. The fuel tank dam according to claim 2, wherein one member of the first member and the second member comprises a contact portion contacting an other member of the first member and the second member, wherein the sealing mechanism comprises:

a first extending portion extending from the contact portion such that a space is formed between the first extending portion and the other member; and a second extending portion extending from the first extending portion toward the other member, and wherein the first lip seal portion and the second lip seal portion sandwich the second extending portion.

4. The fuel tank dam according to claim 3, wherein the sealing mechanism further comprises a third extending portion extending from the first extending portion toward the other member on a tip side of the second extending portion, and wherein the one end of the elastic member is sandwiched between the third extending portion and the other member.

5. The fuel tank dam according to claim 3, wherein the first lip seal portion is disposed on an inner side of the second extending portion in the space, wherein the sealing mechanism further comprises a support portion, and wherein the support portion is disposed between the first lip seal portion and a wall surface of the space such that the lip seal portion is pushed against the second extending portion.

6. The fuel tank dam according to claim 5, wherein the support portion is a part of the elastic member.

7. The fuel tank dam according to claim 5, wherein the support portion includes a support member provided separately from the elastic member.

8. The fuel tank dam according to claim 5, wherein the support portion comprises a sealant portion filled between the first lip seal portion and the wall surface of the space.

9. A fuel tank dam closing a gap formed between a first structural component and a second structural component comprising:

a first portion disposed on a first structural component side;

a second portion disposed on a second structural component side;

an elastic member supported by the first portion at one end while supported by the second portion at an other end, and closing a gap formed between the first portion and the second portion; and a sealing mechanism configured to seal between the first portion and the elastic member, wherein the first portion comprises:

a first member disposed on the first structural component; and a second member disposed on the first member, and wherein the one end of the elastic member is sandwiched between the first member and the second member so as to be supported by the first member and the second member.

10. The fuel tank dam according to claim 9, wherein one member of the first member and the second member comprises a contact portion contacting an other member of the first member and the second member, wherein the sealing mechanism comprises:

a first extending portion extending from the contact portion such that a space is formed between the first extending portion and the other member; and a second extending portion extending from the first extending portion toward the other member;

a seal portion of the elastic member; and a support portion disposed on an inner side of the second extending portion in the space, wherein the seal portion is disposed on the inner side of the second extending portion in the space, and wherein the support portion is disposed between the seal portion and a wall surface of the space such that the seal portion is pushed against the second extending portion.

11. The fuel tank dam according to claim 9, wherein one member of the first member and the second member comprises a contact portion contacting an other member of the first member and the second member, wherein the sealing mechanism comprises:
an extending portion extending from the contact portion such that a space is formed between the extending portion and the other member; and
a compressed portion formed on the one end of the elastic member, and
wherein the compressed portion is sandwiched between the extending portion and the other member so as to be compressed.

12. The fuel tank dam according to claim 9, wherein one member of the first member and the second member comprises a contact portion contacting an other member of the first member and the second member, wherein the sealing mechanism comprises:
an extending portion extending from the contact portion such that a space is formed between the extending portion and the other member; and
a compressed member disposed in the space, wherein the one end of the elastic member is disposed in the space, and
wherein the compressed member is disposed between the one end of the elastic member and the extending portion while being compressed.

13. The fuel tank dam according to claim 9, wherein the sealing mechanism comprises:
a first sealant portion disposed between the one end of the elastic member and the first member; and
a second sealant portion disposed between the one end of the elastic member and the second member.

14. The fuel tank dam according to claim 9, wherein the sealing mechanism has a labyrinth seal structure formed by the first portion and a shape of the one end of the elastic member, and
wherein the labyrinth seal structure is filled with a sealant.

15. The fuel tank dam according to claim 9, wherein the sealing mechanism comprises:
a first member contact portion of the first member contacting the second member;
a first member extending portion extending from the first member contact portion such that a space is formed between the first member extending portion and the second member;
a first member holding portion extending from the first member extending portion toward the second member;
a second member contact portion of the second member contacting the first member contact portion;
a second member extending portion extending from the second member contact portion such that the space is formed between the second member extending portion and the first member;
a second member holding portion extending from the second member extending portion toward the first member;
a first lip seal portion of the elastic member pushed against the first member in the space; and a second lip seal portion of the elastic member pushed against the second member in the space, and wherein the elastic member is sandwiched between the first member holding portion and the second member holding portion.

16. A fuel tank dam closing a gap formed between a first structural component and a second structural component comprising:
a first portion disposed on a first structural component side;
a second portion disposed on a second structural component side;
an elastic member supported by the first portion at one end while supported by the second portion at an other end, and closing a gap formed between the first portion and the second portion; and
a sealing mechanism disposed to seal between the first portion and the elastic member,
wherein the sealing mechanism comprises a lip seal portion of the elastic member,
wherein the first structural component is extending along a first direction,
wherein the second structural component is disposed along a plane perpendicular to the first direction,
wherein a cutout portion is formed at an end portion of the second structural component,
wherein the first structural component is arranged to pass through the cutout portion, and
wherein the elastic member is disposed to close the gap formed between the first structural component and the second structural component in the cutout portion.

17. The fuel tank dam according to claim 16,
wherein the one end of the elastic member is fixed to the first structural component by a fastener,
wherein the other end of the elastic member is fixed to the second structural component by another fastener, and
wherein the elastic member is disposed to close the gap formed between the first structural component and the second structural component.

18. The fuel tank dam according to claim 16, wherein the first portion is formed of resin and joined to the first structural component;
wherein the second portion is formed of resin and joined to the second structural component,
wherein the elastic member is embedded in the first portion at the one end while embedded in the second portion at the other end, and
wherein the elastic member is disposed to close a gap formed between the first structural component and the second structural component.

19. The fuel tank dam according to claim 18, wherein uneven structures are formed at the one end and the other end of the elastic member, respectively.

20. The fuel tank dam according to claim 18, wherein a surface of at least one of the elastic member and the first portion is roughened at a joint portion between the one end of the elastic member and the first portion, and
wherein a surface of at least one of the elastic member and the second portion is roughened at a joint portion between the other end of the elastic member and the second portion.

* * * * *